United States Patent
Walker et al.

(10) Patent No.: US 7,537,286 B2
(45) Date of Patent: May 26, 2009

(54) SEAT WITH ADJUSTABLE SUPPORT SYSTEM

(76) Inventors: Brock M. Walker, 4095 Hulett Rd., Okemos, MI (US) 48864; James A. O'Brien, 420 Carey St., Deerfield, MI (US) 49238

( * ) Notice: Subject to any disclaimer, the term of this patent is extended or adjusted under 35 U.S.C. 154(b) by 249 days.

(21) Appl. No.: 11/166,341

(22) Filed: Jun. 27, 2005

(65) Prior Publication Data
US 2006/0001304 A1    Jan. 5, 2006

Related U.S. Application Data

(60) Provisional application No. 60/583,376, filed on Jun. 28, 2004.

(51) Int. Cl.
*B60N 2/66*    (2006.01)
(52) U.S. Cl. ............... 297/284.4; 297/284.3; 297/284.8
(58) Field of Classification Search ............. 297/284.3, 297/284.4, 284.8
See application file for complete search history.

(56) References Cited

U.S. PATENT DOCUMENTS

| | | | | |
|---|---|---|---|---|
| 3,288,525 A | * | 11/1966 | Cerf | 297/284.8 |
| 4,437,702 A | * | 3/1984 | Agosta | 297/284.8 |
| 4,564,235 A | * | 1/1986 | Hatsutta et al. | 297/284.4 |
| 4,883,320 A | * | 11/1989 | Izumida et al. | 297/452.56 |
| 5,240,308 A | * | 8/1993 | Goldstein et al. | 297/284.3 |
| 5,505,520 A | | 4/1996 | Frusti et al. | |
| 5,567,010 A | | 10/1996 | Sparks | |
| 5,718,476 A | * | 2/1998 | De Pascal et al. | 297/284.4 |
| 5,833,319 A | * | 11/1998 | Davis | 297/452.21 |
| 5,868,466 A | * | 2/1999 | Massara et al. | 297/284.6 |
| 6,092,871 A | * | 7/2000 | Beaulieu | 297/284.4 |
| 6,125,851 A | | 10/2000 | Walker et al. | |
| 6,129,419 A | * | 10/2000 | Neale | 297/284.4 |
| 6,532,962 B1 | | 3/2003 | Walker et al. | |

(Continued)

FOREIGN PATENT DOCUMENTS

DE    10114521    9/2002

(Continued)

OTHER PUBLICATIONS

European Search Report issued Jul. 25, 2007 in European patent application No. 05013983.1.

(Continued)

*Primary Examiner*—Peter R. Brown
(74) *Attorney, Agent, or Firm*—Broad and Cassel; Alejandro J. Fernandez

(57) ABSTRACT

A sacral support assembly for use with a seat is provided. The seat includes a seat frame. An adjustable sacral support assembly is connected to the seat frame. The sacral support assembly includes a sacral support member adapted to support the sacrum of a seated user even when an obstruction is located between the user and the sacral support assembly. A method is also provided for delivering primary support to a user's sacrum and sacral-pelvic anatomy and secondary support to the remaining regions of the spine and/or adjacent anatomy to reduce fatigue, increase comfort, structural balance, stability, and posture control for a user, and a system for adjusting and controlling the load distribution from the sacral anatomy to the spine and other anatomical structures adjacent to a user's sacrum, for example, the pelvis, lumbar, thoracic and cervical regions.

7 Claims, 16 Drawing Sheets

U.S. PATENT DOCUMENTS

| | | | | |
|---|---|---|---|---|
| 6,824,214 B2 * | 11/2004 | McMillen | ................ | 297/284.7 |
| 2002/0008417 A1 * | 1/2002 | Holst et al. | .............. | 297/284.4 |
| 2002/0109383 A1 | 8/2002 | Klingler | | |
| 2004/0075320 A1 | 4/2004 | Klingler | | |

FOREIGN PATENT DOCUMENTS

| | | |
|---|---|---|
| EP | 0423079 | 4/1991 |
| JP | 03029610 | 2/1991 |
| JP | 08191734 | 7/1996 |
| JP | 2002360375 | 12/2002 |
| WO | WO 2004/089693 | 10/2004 |

OTHER PUBLICATIONS

Search Report and Written Opinion mailed Jul. 27, 2007 in international appln. No. PCT/US2006/041878.

* cited by examiner

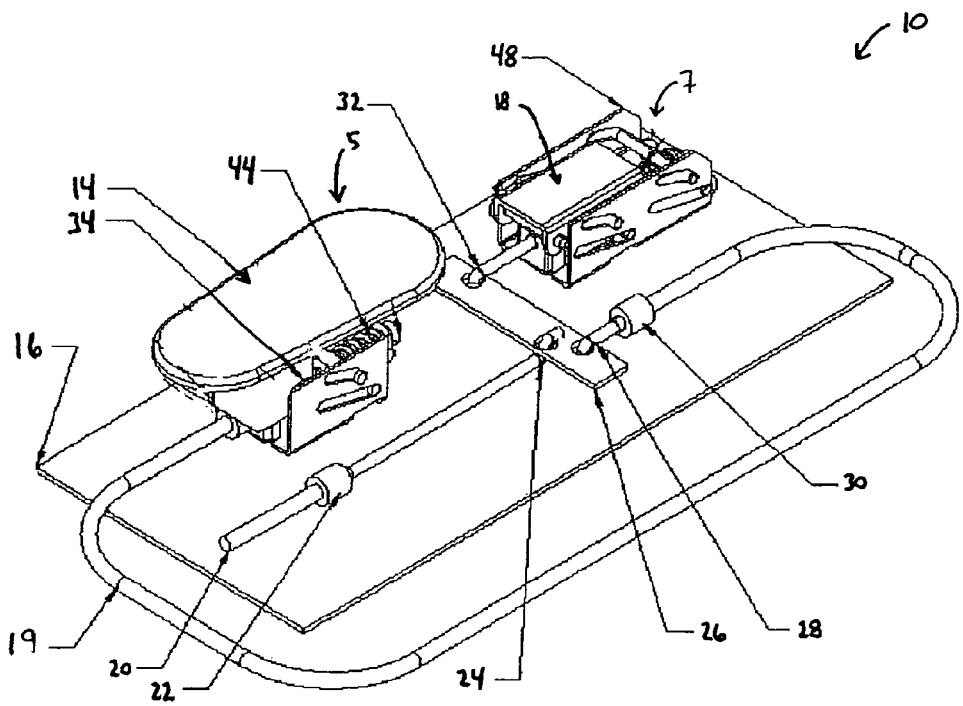
(FIG. 1)
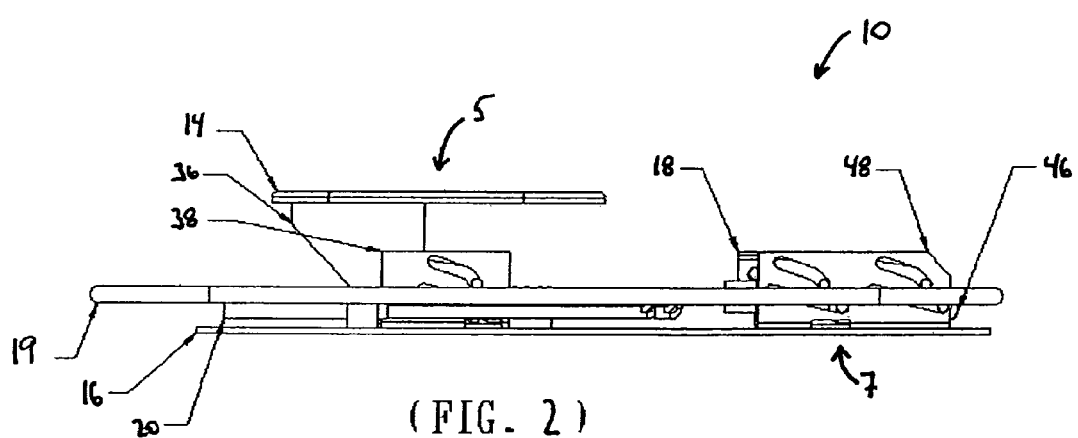
(FIG. 2)

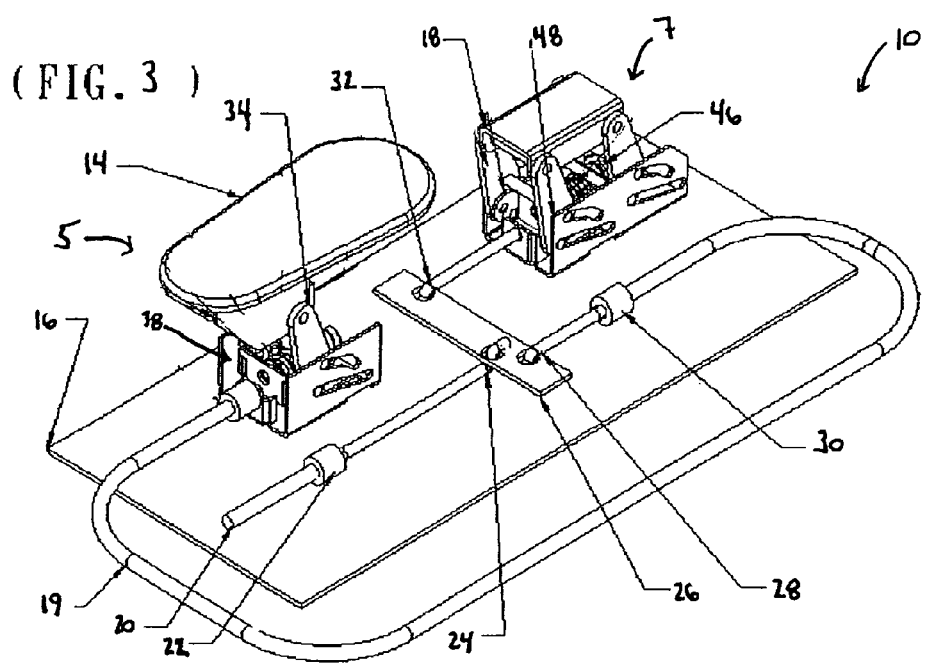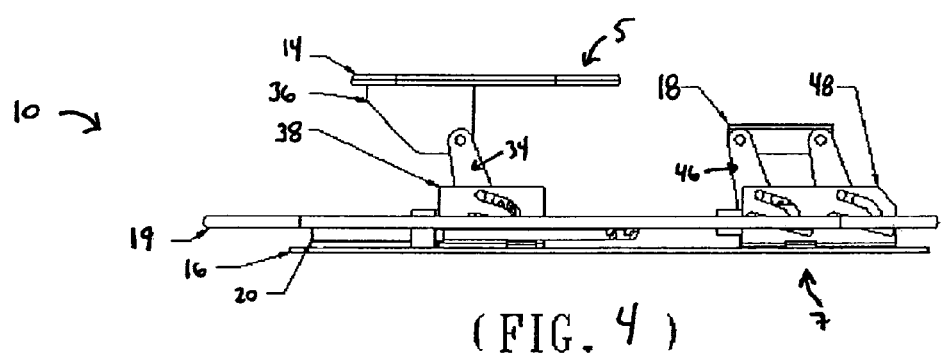

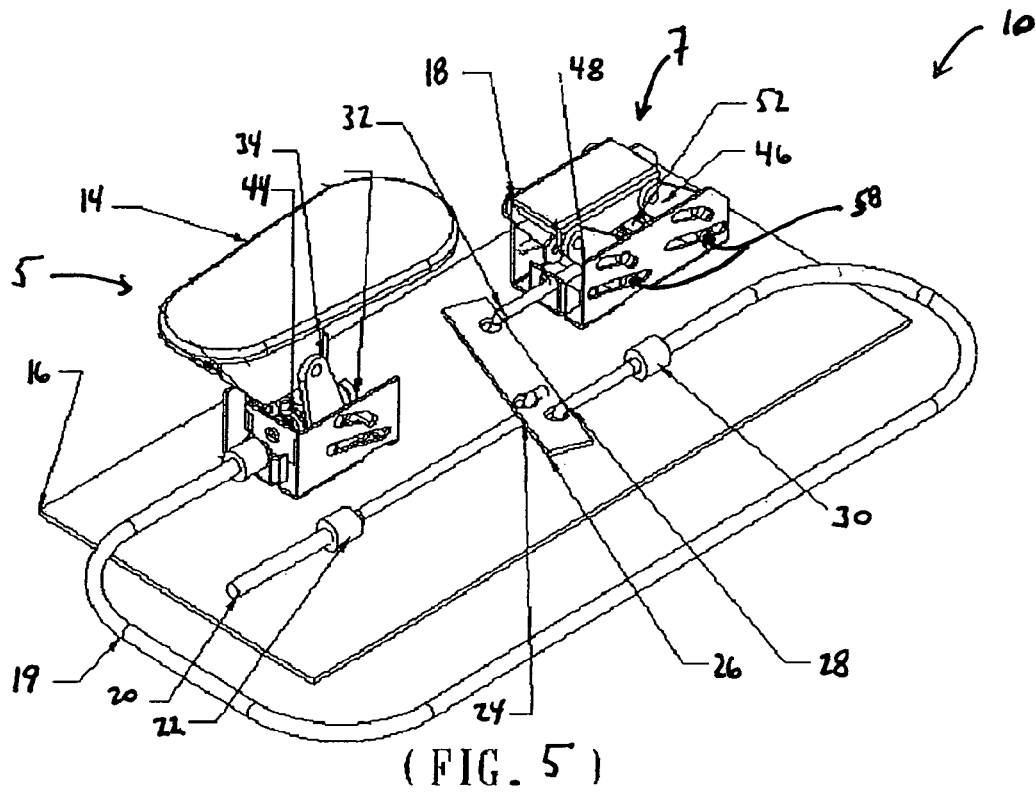
( FIG. 5 )
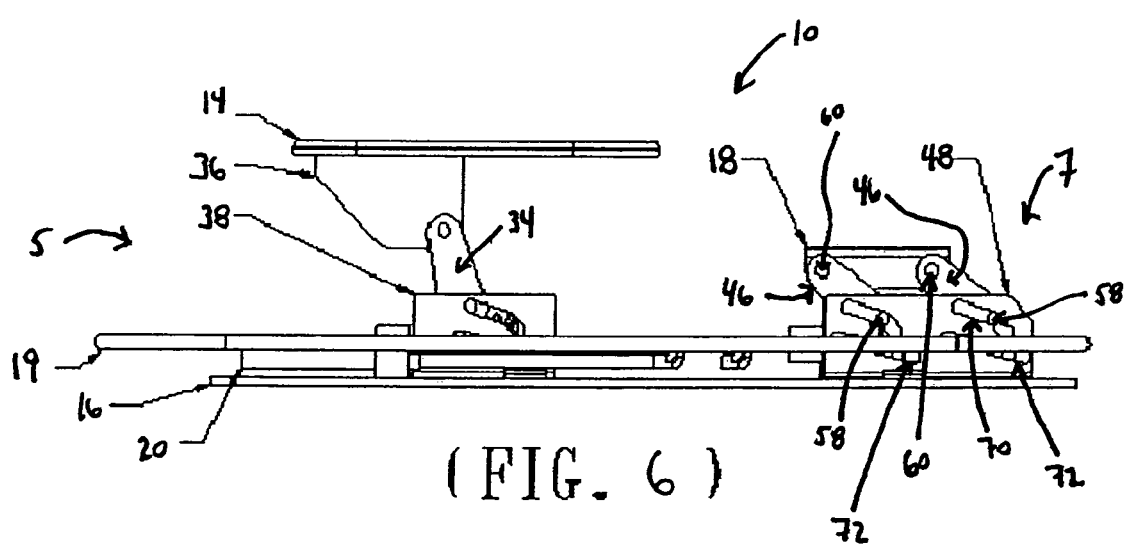
(FIG. 6)

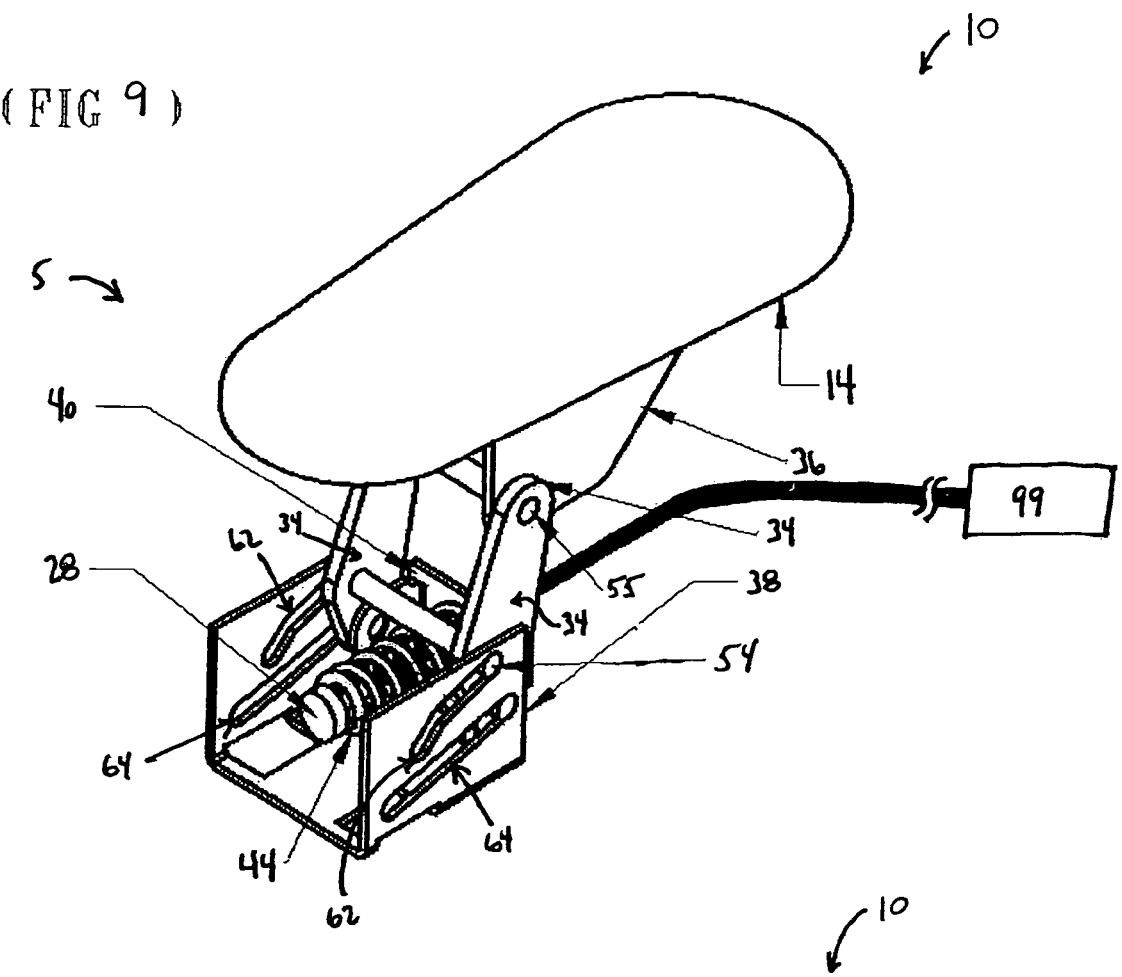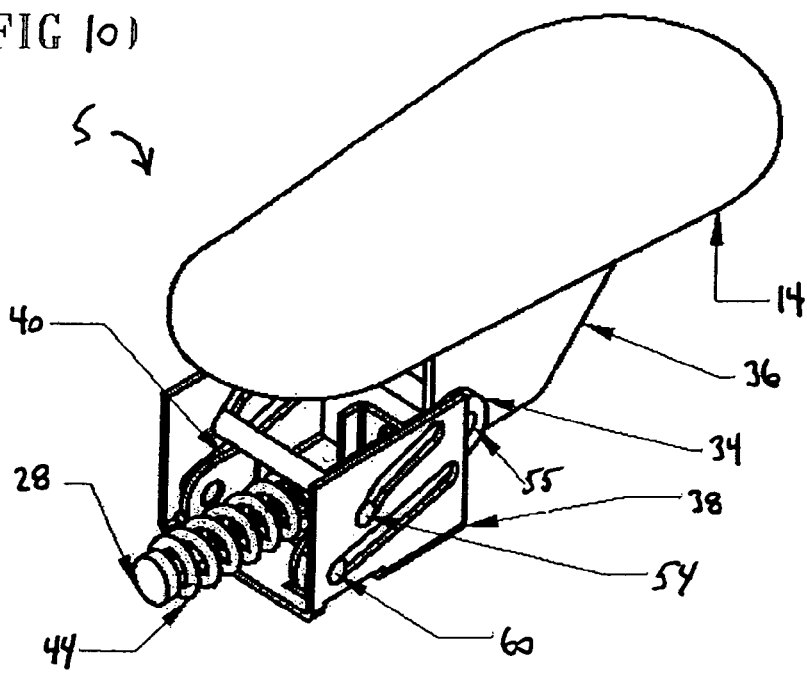

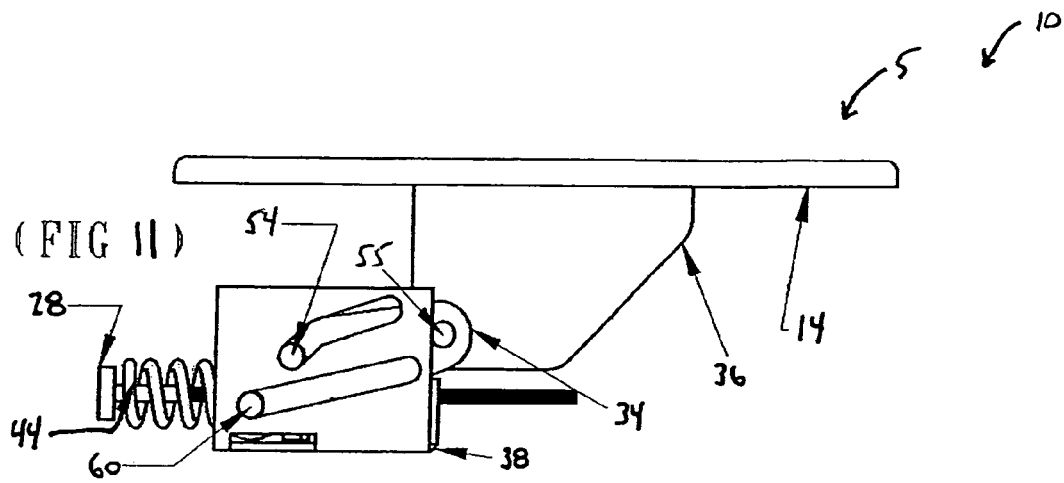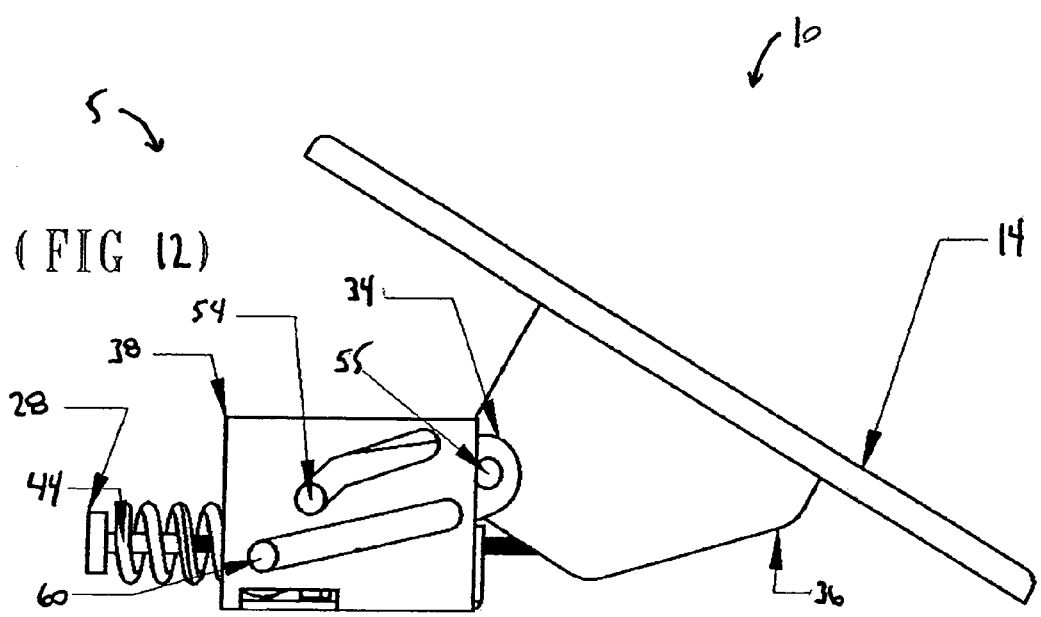

SEAT WITH ADJUSTABLE SUPPORT SYSTEM

FIELD OF THE INVENTION

The present disclosure relates generally to a seat having an adjustable support system for controlling the posture and/or balance of a seated person.

BACKGROUND

Many people in modern society spend extended amounts of time seated at work, school, home, and/or while traveling. Millions of people sit during lengthy commutes to and from work. Once at work, they sit continuously in an office chair for numerous hours. Additionally, many occupations require spending much of the day seated in an automobile. For example police officers, truck drivers, and taxi cab drivers, have jobs that require spending much of the day seated in an automobile. Similarly, airplane pilots spend much of the day seated in airplane seats.

For the most part, seats have several elements in common. They have a bottom portion, or seat pan, which receives the bulk of a user's weight, and a seatback, against which a user reclines. As relates to the seatback, a wide variety of mechanisms have been developed that purportedly provide back support for a user. Nevertheless millions of people continue to suffer from chronic and severe back pain caused by sitting for extended amounts of time. This is because conventional seatbacks have yet to provide back support that proactively resolve the medical causes of back pain, rather than the symptoms of back pain.

By way of background, the spine has four regions: cervical (neck), thoracic (upper back), lumbar (lower back), and sacral (tail bone). The sacrum is a large triangular fusion of five vertebrae that forms the base of the spine. The sacrum is located between the pelvic bones, which include the left and right ilium. The ilia each have a posterior border portion known as the posterior superior iliac spine ("PSIS"). The lumbar region includes the five vertebrae located above the sacrum, the thoracic region includes the twelve vertebrae located above the lumbar region, and the cervical region includes the seven vertebrae located above the thoracic region. Each region of the spine transitions into the adjacent region(s). For example, there is a thoracic-lumbar transition extending between thoracic vertebra 12(T12) and lumbar vertebra 1(L1).

As viewed from the side, the spine of a person with good posture forms a rearward curve known as the thoracic or kyphotic curve, and two forward projecting curves known as the lumbar or lordotic curve and the cervical curve. When taken together, these three curves form an S-shaped portion of the spine. This S-shape provides a great deal of strength, stability, flexibility, and endurance because the body primarily relies on the skeletal structures (i.e., the vertebrae) to support the weight of a persons body, rather than primarily relying on the musculature for support.

Relating to a user's posture, conventional seats have a number of shortcomings. First, conventional seats cause a user's spine to collapse from an S-shape into a C-shape. This collapse occurs because of improper back support. Stated differently, conventional seats lack strategically located support. Without strategically located support, the sacrum tilts rearward, and causes the spine to assume a C-shape. When the spine is in a C-shape, the user primarily relies on the musculature for support rather than skeletal structures. Sitting with the spine in a C-shape and over-relying on the musculature for support can lead to a number of immediate problems, for example, increased fatigue, increased pressure on the lumbar discs, or the creation of muscle stresses, strains, and spasms. Moreover, various long-term problems can also occur. These problems include pain in the lower back muscles, discomfort between the shoulder blades, tightening of neck muscles and muscle soreness and headaches.

A second problem is that conventional seats lack a contoured surface match between the surface of the seat and the surface of a user's anatomy. For example, conventional seats lack a proper nesting or receiving portion for the PSIS. In particular, the seat back pressures the PSIS. This can lead to poor posture, which often results in varying degrees of discomfort and back or spine problems. Forth, conventional seats provide poor distribution of the load forces experienced by the user.

Somewhat recently, it has been recognized that a spinal support device for applying a directed and concentrated force on the sacrum to properly position the pelvis and spine of a user could be constructed. In U.S. Pat. No. 6,125,851 ("the '851 patent"), a spinal support device is disclosed that helps support the sacrum of a user to induce the spine to take the preferable shape found in a normal standing posture.

While the '851 patent in part addresses the void created by seats around the sacral region, there still exists an urgent need to implement proper sacral support integrated within seatbacks, such as those used in residential seating, office seating, and/or vehicular seating. In particular, there exists a need to provide proper sacral support in a system that is integral to a seatback and adjusts according to the preferences of a variety of users that differ from each other in proportion and size. In addition, there exists a need to provide improved load distribution across the surrounding pelvic area, especially around the PSIS.

A full support system is also urgently needed, including proper primary sacral support combined with secondary or complementary support for other regions of the spine. Moreover, proper sacral support is urgently needed by persons that have obstructions between their backs and the seatbacks. For example, police officers often wear a belt with a handcuff wallet. The handcuff wallet forms a bulge or obstruction that makes sitting with good posture particularly difficult. Similarly, military personnel wear various body armors, and construction workers often wear bulky tool belts that can cause the spine to shift out of proper alignment when the worker is in a seated position.

SUMMARY OF THE INVENTION

The present invention is directed to an improved seat. According to a first aspect of the present invention, the improved seat delivers adjustable, specific, stabilizing support, and contoured fit to a user's sacrum and sacral-pelvic anatomy, while allowing the user to wear a waist pack, a belt having a handcuff wallet, body armor, a tool belt, or other obstruction. The improved seat effects changes in a user's sacral anatomy that result in user efficiency, strength, and muscle control. The improved seat actively targets and controls specific portions of the sacrum, thereby increasing the comfort, endurance, and stability of a user. This is accomplished in an adjustable, convenient manner for users who differ from each other in proportion and size. Furthermore, the improved seat provides anatomically contoured fit by offering a surface match between the contours of a user's anatomy and the seatback.

According to a second aspect of the present invention, a sacral support assembly for use with a seat is provided. The sacral support assembly provides a support mechanism that primarily supports the sacrum and sacral-pelvic anatomy, while providing secondary or complementary support for one or more of the remaining regions of the spine.

As used herein the term "connected to" is intended to be interpreted broadly and to include direct and indirect connections.

As used herein the term "vehicle" is intended to be interpreted as broadly including transportation-related applications in general, for example, automobiles, airplanes, boats, trains, wheelchairs, etc.

These and other features, aspects, and advantages of the present invention will become better understood with reference to the following description, appended claims, and accompanying drawings where:

BRIEF DESCRIPTION OF THE DRAWINGS

FIG. 1 is a front perspective view of an adjustable support system including a retracted sacral support and a retracted thoracic-lumbar support;

FIG. 2 is a side view of an adjustable support system including a sacral support and a thoracic-lumbar support;

FIG. 3 is a front perspective view of an adjustable support system including a sacral support in an extended position and a thoracic-lumbar support in an extended position;

FIG. 4 is a side view of an adjustable support system including a sacral support in an extended position and a thoracic-lumbar support in an extended position;

FIG. 5 is a front perspective view of an adjustable support system including a sacral support in an extended position and a thoracic-lumbar support in a partially extended position;

FIG. 6 is a side view of an adjustable support system including a sacral support in an extended position and a thoracic-lumbar support in a partially extended position;

FIG. 9 is a front perspective view of a sacral support in an extended position;

FIG. 10 is a front perspective view of a sacral support in a retracted position;

FIG. 11 is a side view of a sacral support in a retracted position;

FIG. 12 is a front perspective view of a sacral support in a retracted and tilted position;

DETAILED DESCRIPTION OF THE PREFERRED EMBODIMENTS

Figure 7:
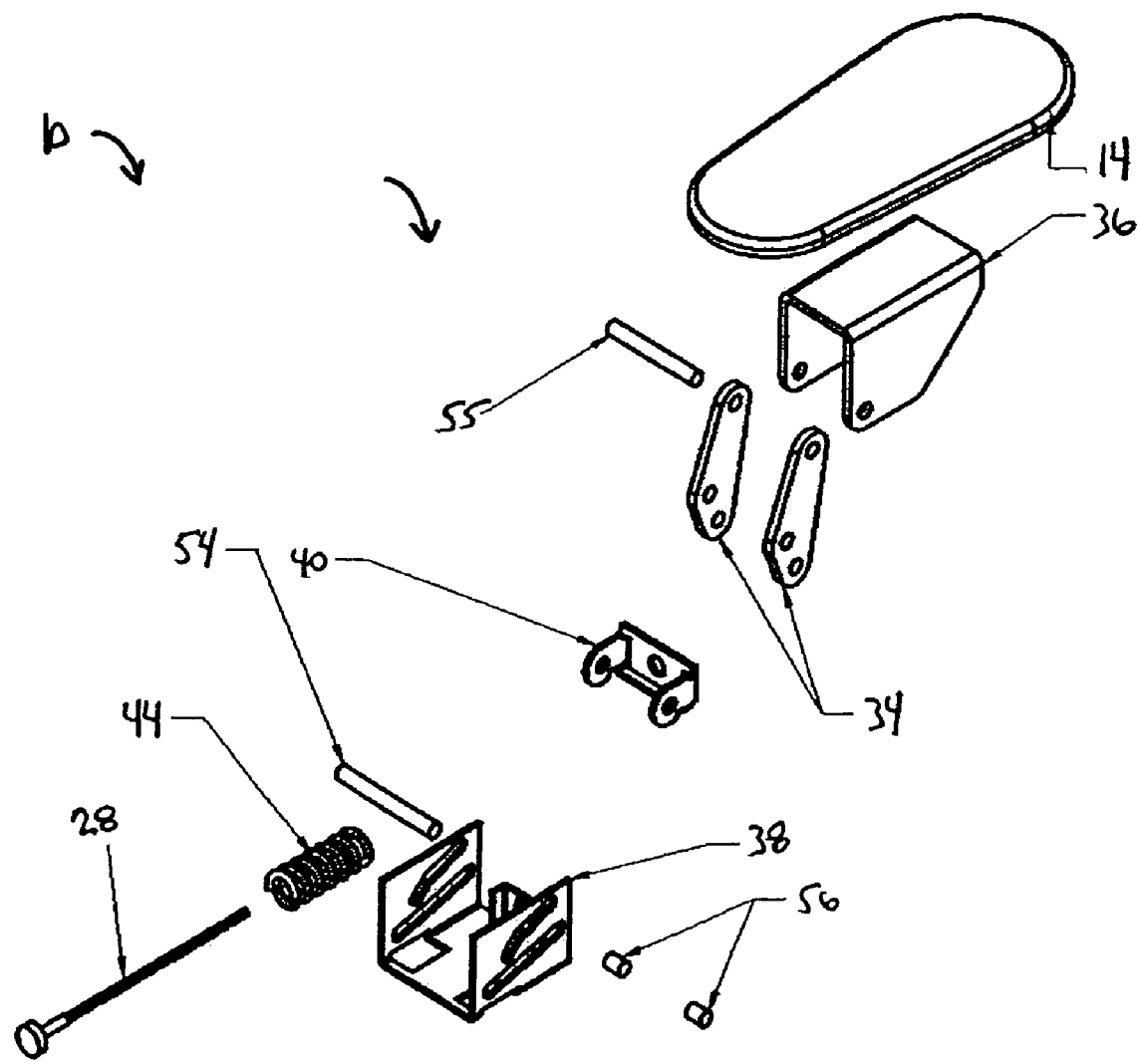
FIG. 7 is an exploded view of a sacral support.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly. Moreover, it should be noted that the invention described herein includes methodologies that have a wide variety of applications, including, for example, office, residential, and commercial seating applications.

Referring to the drawings, FIG. 1 illustrates an embodiment of the present invention, and particularly, an adjustable support system having a sacral support system and a complementary support system. The adjustable support system can control the position of the user's sacral-pelvic region, thoracic-lumbar area, mid and upper thoracic area, or a wide variety of other parts of a user's back. Such support ultimately can be used to control the user's overall seated posture.

In general, the sacral support system includes a sacral support member that is configured to tilt vertically along a plane formed by the seatback. This allows a user wearing a utility belt, a waist pack, a handcuff wallet, body armor, or other obstructive element (even as small as a belt loop), to contact the sacral support without creating an uncomfortable pressure zone around the user's sacral area. The tilt feature thus allows the seatback to comfortably accommodate or nest an obstructive element without sacrificing comfort or sacral support. The sacral support system also includes a delivery mechanism that a user can use to adjust the amount of sacral support delivered by the sacral support system.

The sacral support system can be used either alone or in cooperation with complementary support system. In general, the complementary support system includes a support member and a delivery mechanism that is controlled by the user. The complementary support can be positioned within the seatback at a wide variety of positions that correspond with different areas of a user's back. For example, the complementary support system can be located within the seatback at a position corresponding with the thoracic-lumbar transition or the upper thoracic region of a user. The sacral support system and the complementary support system are each discussed in detail as follows.

Referring to FIG. 1, sacral support system 5 includes a sacral support member 14, which is located within the seatback at a position that corresponds with the sacrum and sacral-pelvic anatomy of a user. The sacral support member is engineered to support the sacrum and sacral-pelvic anatomy of a user. The sacral support member preferably is formed of a substantially rigid material, such as steel, plastics, or carbon fiber, but materials providing a similar level of support can also be used. Sacral support member 14 is generally flat, pear-shaped, and oriented with a larger width at a top portion and a smaller width at a bottom portion. This shape and orientation coincides with the shape and orientation of the sacrum of a user. More specifically, an upper portion of sacral support member 14 has a horizontal width of approximately 3.25 inches. A lower portion of sacral support member 14 has a horizontal width of approximately 2.6 inches. Preferably, the vertical length of sacral support member 14 is approximately 5.25 inches.

The top width of sacral support member 14 can vary from 3 times the width of the sacrum of a user at the level of the sacral base of the user to approximately equal to the width of the sacrum of a user at the level of the sacral base of the user. The width of sacral support member 14 decreases progressively from a top portion to a bottom portion of sacral support member 14. The width of the bottom portion is approximately greater than or equal to the width of the sacrum of a user at a level corresponding with the bottom portion. However, as discussed below, the dimensions of the sacral support member 14 may vary depending on a variety of factors.

Figure 15:
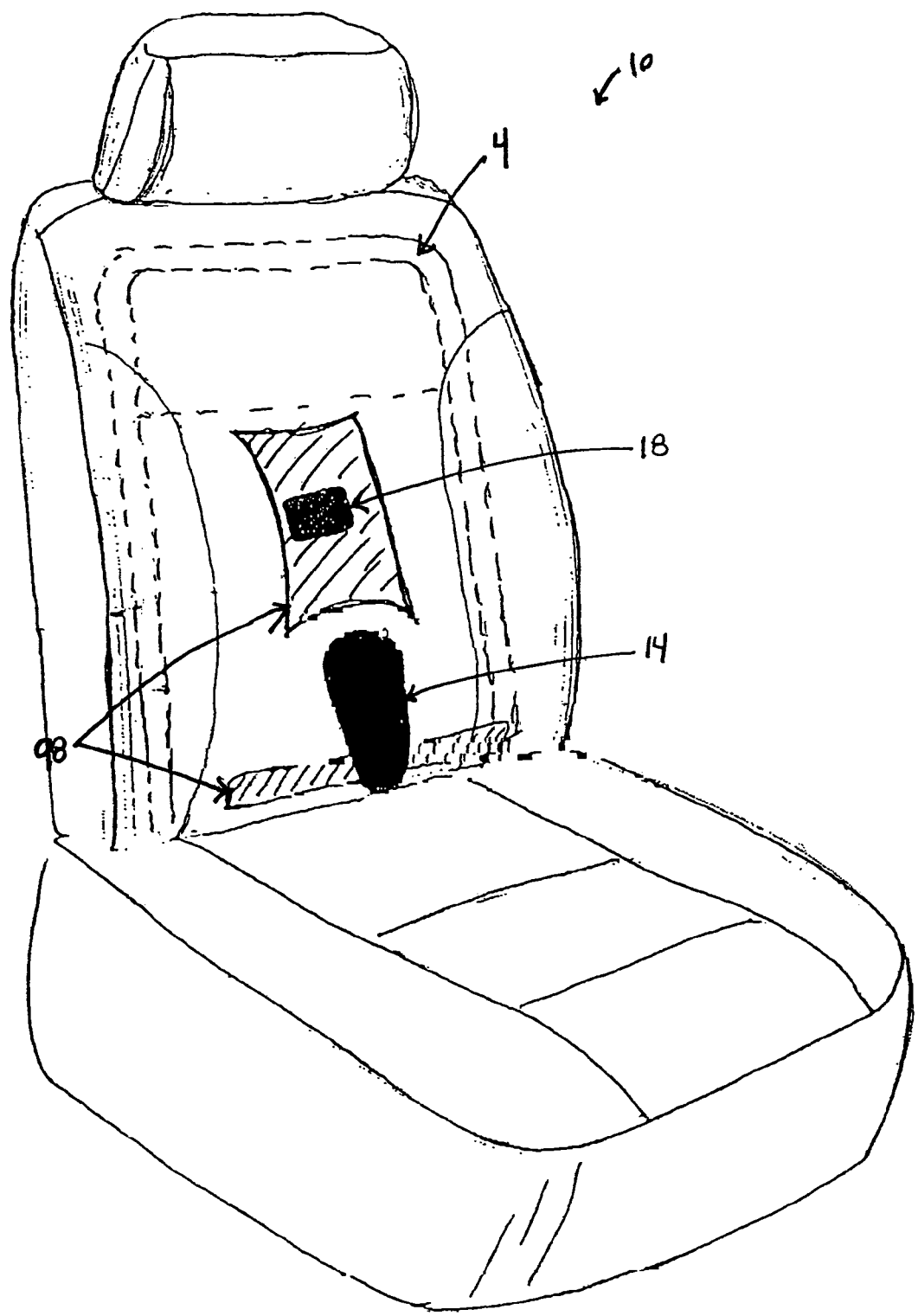
FIG. 15 is a front perspective view of a seat having a sacral support, a thoracic-lumbar support, and a load distribution material.
Figure 16:
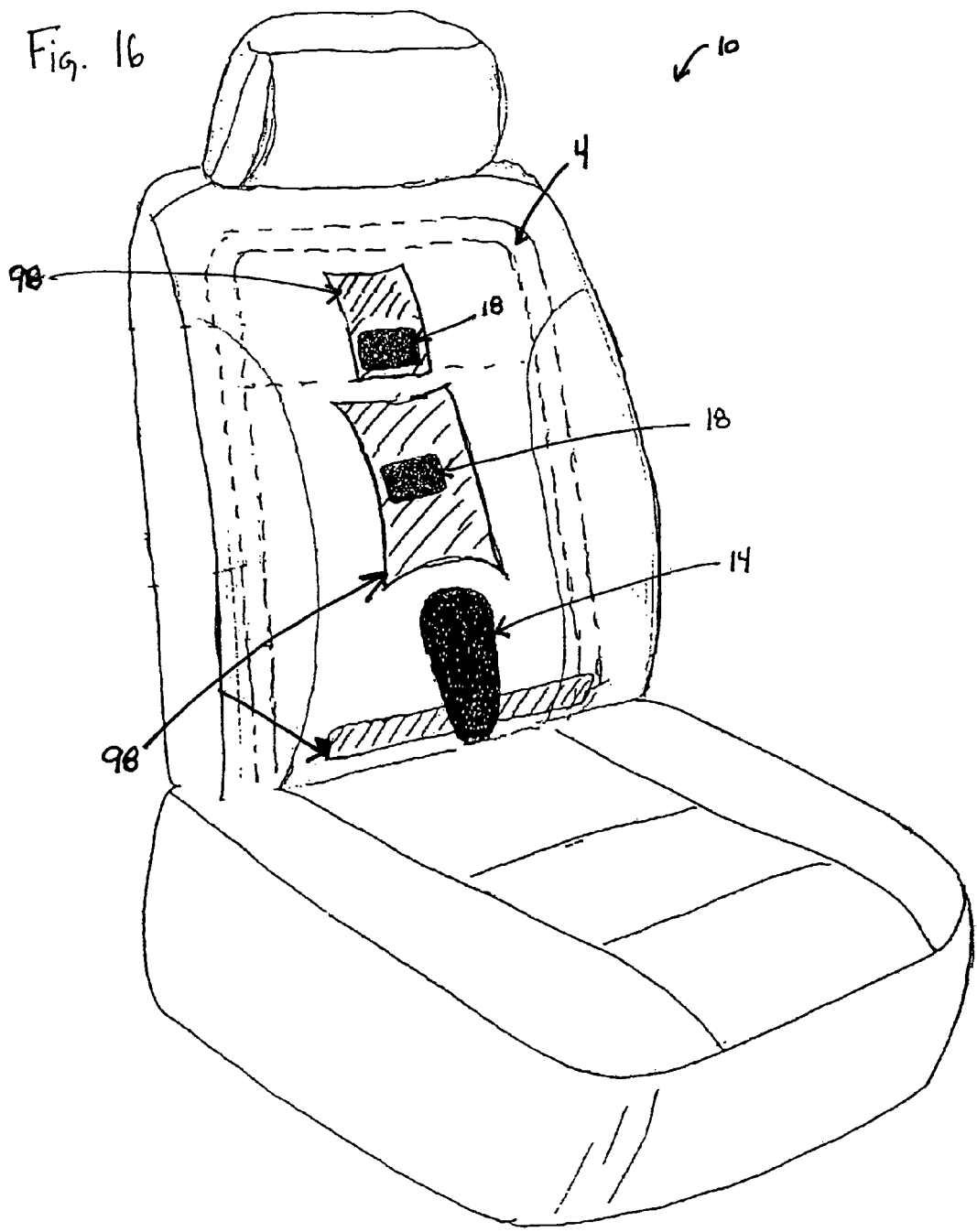
FIG. 16 is a front perspective view of a seat having a sacral support, a thoracic-lumbar support, and a load distribution material.
Figure 17:
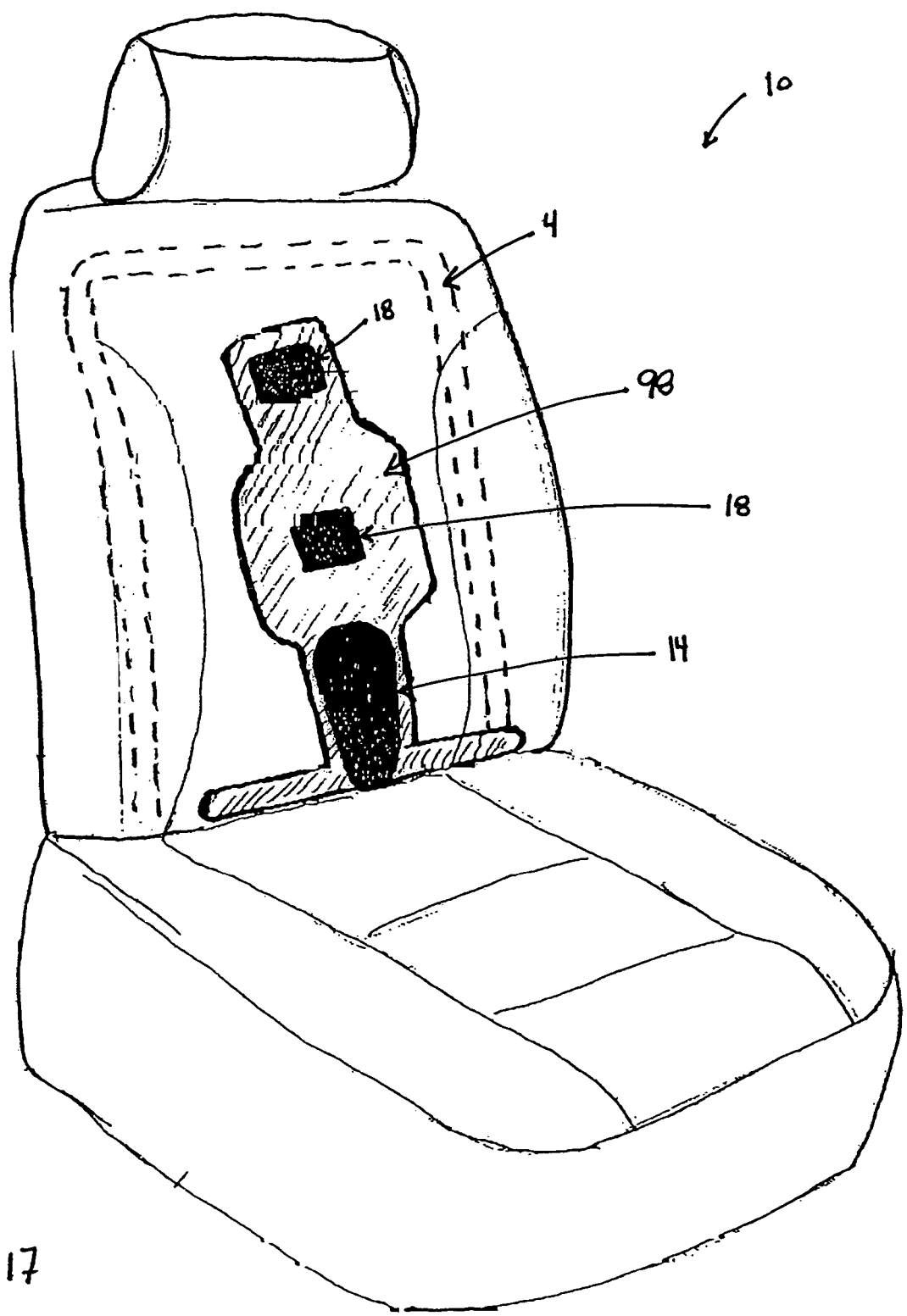
FIG. 17 is a front perspective view of a seat having a sacral support, a thoracic-lumbar support, and a load distribution material.
Figure 18:
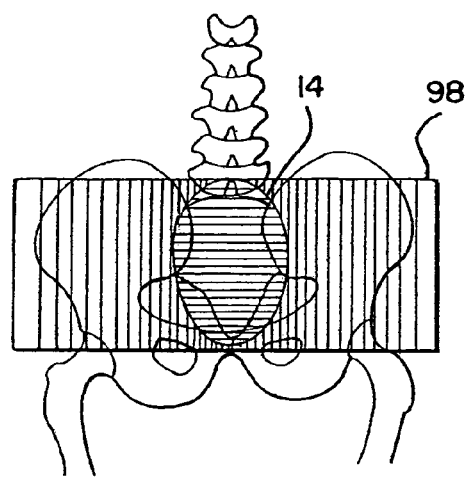
FIG. 18 is a rear sectional view of a load distribution material for use with a sacral support system.
Figure 19:
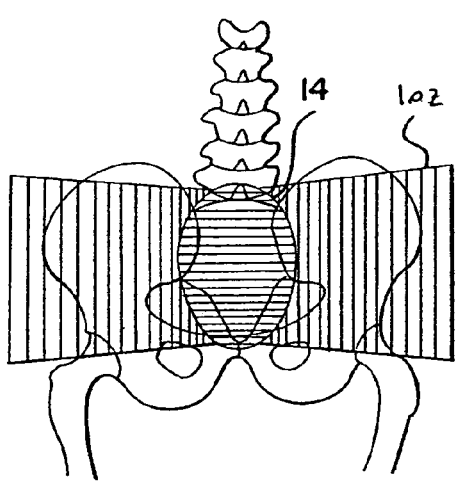
FIG. 19 is a rear sectional view of a load distribution material for use with a sacral support system.
Figure 20:
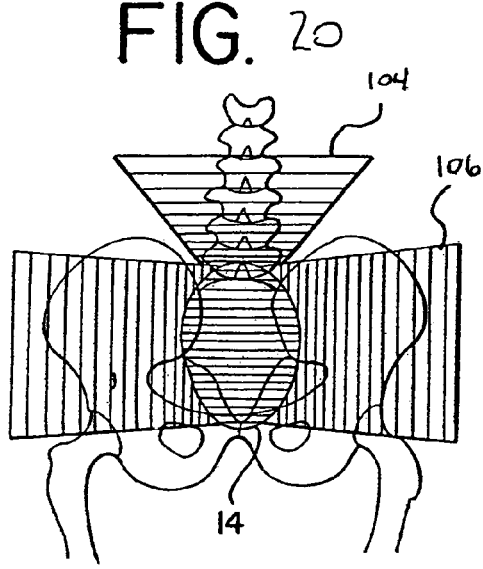
FIG. 20 is a rear sectional view of a load distribution material for use with a sacral support system.
Figure 21:
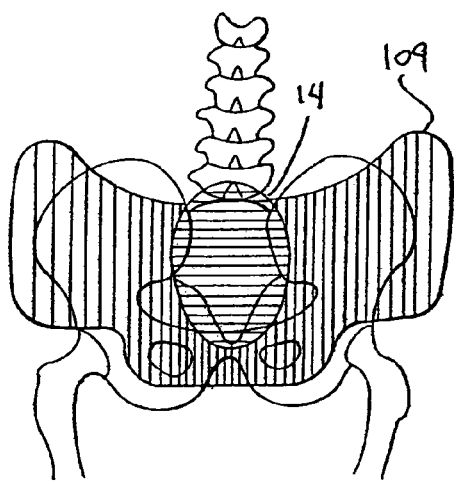
FIG. 21 is a rear sectional view of a load distribution material for use with a sacral support system.

Since sacral support member 14 is preferably rigid and mainly supports the sacrum, it is preferable to provide a load distribution material between sacral support member 14 and the sacrum of a user, as illustrated in FIGS. 14-17. For example, as illustrated in FIG. 15, load distribution material 98 provides a surface that adjusts to the contours of the sacrum and sacral-pelvic area of a user. Alternatively, as illustrated in FIG. 18, load distribution material 98 provides a contoured, nesting area for the PSIS's of the ilias. Other preferred arrangements and designs of the load distribution material are illustrated in FIGS. 14-17 and 18-21. For example, FIG. 19 illustrates an embodiment in which the load distribution material 102 is partially butterfly-shaped. FIG. 20 illustrates and embodiment in which two load distribution materials, 104 and 106, are provided. FIG. 21 illustrates a load distribution material 109 designed to generally cover the anatomical surfaces of the sacral-pelvic area, while also avoiding the PSIS's of the ilias.

In use, when sacral support member 14 is in an engaged position, the load distribution material improves load distribution across soft tissues of the sacral area of the user and avoids localized pressure on the PSIS's of the ilias. Preferably, conventional support materials may be used to provide load distribution, such as compressed foams, plastics or strips of lightweight metals, for example aluminum. The size and shape of the load distribution material may be altered to accommodate the user's specific anatomical contours and provide improved support and fit. The size and shape of the load distribution can also be altered depending on the particular seat trim package. For example, bucket type seats configured for racing applications can be outfitted with relatively rigid load distribution materials, so as to provide greater support and load distribution.

In addition, cushioning is preferably provided between the user, the front portion of the seatback and load distribution material. The cushioning may be formed of conventional cushioning materials such as foam. Accordingly, in a preferred embodiment, a front portion of the seatback is followed by a cushioning, which is followed by a load distribution material, which is followed by sacral support member 14.

Alternatively, a load distribution material can be provided between the front portion of the seatback and the cushioning.

It should be understood that the amount of load distribution material, cushioning, and the dimensions of the sacral support member are related, and can be altered while still achieving the desirable levels of sacral support and contoured fit. For example, to some extent, a sacral support member having smaller dimensions than discussed above may be used if a relatively large load distribution material or cushion is provided between the sacral support member and the user. Conversely, a larger sacral support member than suggested above may be used if relatively less cushioning and load distribution material is provided between the sacral support member and the user. Also, the sacral support member, the load distribution material and cushion may be formed of a unitary structure while still achieving the preferred results of sacral support and contoured fit. Similarly, the load distribution material can be attached directly to the sacral support member.

When the sacral support is in an engaged position, sacral support member 14 extends approximately between 1.5 inches and 3 inches forward with respect to a plane created by the seatback. It has been discovered that delivering sacral support member 14 a distance greater than about 3 inches forward of the plane created by the seatback is unnecessary. One embodiment of sacral support system shown in FIGS. 1-6 and 9-12 is designed to deliver sacral support member 14 up to 1.25 inches forward of the plane created by the seatback. Notwithstanding this, alternative embodiments of the present invention may deliver sacral support member 14 a maximum distance up to or greater than 3 inches forward of the plane created by a user's back, or a maximum distance less than 3 inches forward of the plane created by a user's back, as described in detail below.

The overall distance of travel of sacral support member 14 toward the user depends on a variety of factors. For example, the overall distance of travel of sacral support member 14 may change depending on the location where the sacral support system is mounted within a seat frame, the size of the seat frame, the type of material used to cover the seat, and the thickness of any cushioning and load distribution material that may be located between the seat cover and sacral support member.

In addition to sacral support member 14, sacral support system 5 includes a delivery mechanism having pitch poles 34, cam profile channel 38, parallel bar 40, compression spring 44 and actuator cable 28, as illustrated in FIG. 7. When used as a stand-alone unit, i.e., without a complementary support system, the sacral support system is attached to the seatback frame. As will become apparent to one of ordinary skill in the art, the cam profile channel 38 can be secured to the seatback frame, for example, by welding. Alternatively, when used in combination with a complementary support system, the sacral support system can be secured to base plate 16, as shown in FIG. 1. In turn, base plate 16 is secured to the seat frame.

The delivery mechanism for adjusting the position of sacral support member 14 is illustrated in FIGS. 9-10. In particular, pin 55 is inserted through holes in pitch poles 34 and support base 36 so as to pivotally connect pitch poles 34 to support base 36. This connection allows the support base to tilt relative to the pitch poles. A wide variety of alternative mechanisms for attaching the pitch poles to the support base will become readily apparent to one of ordinary skill, for example, a ball and socket connection.

As shown in FIG. 9, pin 54 is inserted through holes in pitch poles 34 and is used to slidably connect pitch poles 34 to cam profile channel 38. The ends of pin 54 form cams that slide along the upper cam profiles 62 in cam profile channel 38. In addition, pegs 56 are inserted into peg holes in pitch poles 34 and parallel bar 40. Each peg 56 provides a cam surface that slides along lower cam profile 64 in cam profile channel 38. Since the parallel bar is connected to both pitch poles, the pitch poles travel in tandem along the path created by cam profiles 62 and 64. As illustrated in FIGS. 9-10, the geometry of cam profiles 62 and 64 define the path along which the sacral support member ultimately travels. Accordingly, the geometry of cam profiles 62 and 64 can be altered to change the path along which the sacral support member travels. For example, cam profiles 62 and 64 can be configured so that the sacral support member initially travels in a first direction and subsequently in a second direction.

As illustrated in FIGS. 9 and 10, in operation, a user determines the amount of desired sacral support and then operates the sacral support system to alter the position of the sacral support member. In a disengaged position sacral support member 14 provides minimal or no support to a user's sacrum or sacral area. As desired, a user may adjust the position sacral support member 14 toward the user's sacrum to provide increased support. In particular, when the sacral support system is used as a stand-alone support system (i.e., without a complementary support system), a standard take-up motor 99 can be used to control the position of the sacral support member relative to a user.

As take-up motor retracts actuator cable 28, the end of actuator cable 28 that is adjacent to spring 44 causes spring 44 to compress against parallel bar 40. As the energy stored in spring 44 increases, spring 44 eventually forces parallel bar 40 to move pitch poles 34. Consequently, sacral support member 14 travels toward the user's sacral area as desired by the user. Conversely, the take-up motor can be operated to let out actuator cable 28, thereby returning the sacral support member to a retracted position. Spring 44 and pressure from the seatback and cushioning material assist in returning the sacral support member to a fully retracted position.

When the sacral support system is in a fully or partly extended position, spring 44 forms a spring suspension. In particular, as a user reclines against the engaged sacral support member, the user's sacrum creates a rearward force on sacral support member. This force is distributed to pitch poles 34, causing pitch poles 34 to rotate counter-clockwise. As pitch poles 34 rotate, sacral support member 14 tilts backward at an angle that substantially coincides with the tilt of a user's sacrum. As a result, sacral support member 14 automatically adjusts to the natural tilt of a user's sacrum, while simultaneously providing an adjustable supporting force. In addition, spring 44 continually urges the sacral support member towards a user, thereby providing continuous support, even as the user shifts between wide varieties of seated positions. The adjustable supporting force can be tailored by changing the size or stiffness of the compression spring, as required by various seating environments.

As stated above, sacral support system 5 can be used in cooperation with complementary support system 7. Complementary support system 7 can be located at a wide variety of positions within the seatback so as to correspond with various targeted areas of the spine or adjacent anatomical structures of a user. For example, complementary support 7 can be located within the seatback at a position that allows a user to control fit, comfort and posture. In one such example, complementary support 7 can be located within the seatback at a level corresponding with a user's spine at the area between about thoracic vertebra 12 and lumbar vertebra 1. Alternatively, complementary support 7 can be located within the seatback at a position corresponding with the scapulae or paravertebral muscles of a user. Likewise, complementary support 7 can be located within the seatback so as to provide improved fit, comfort, and posture control by improving the contoured surface contacts between the user's anatomy and the seating surface.

Figure 8:
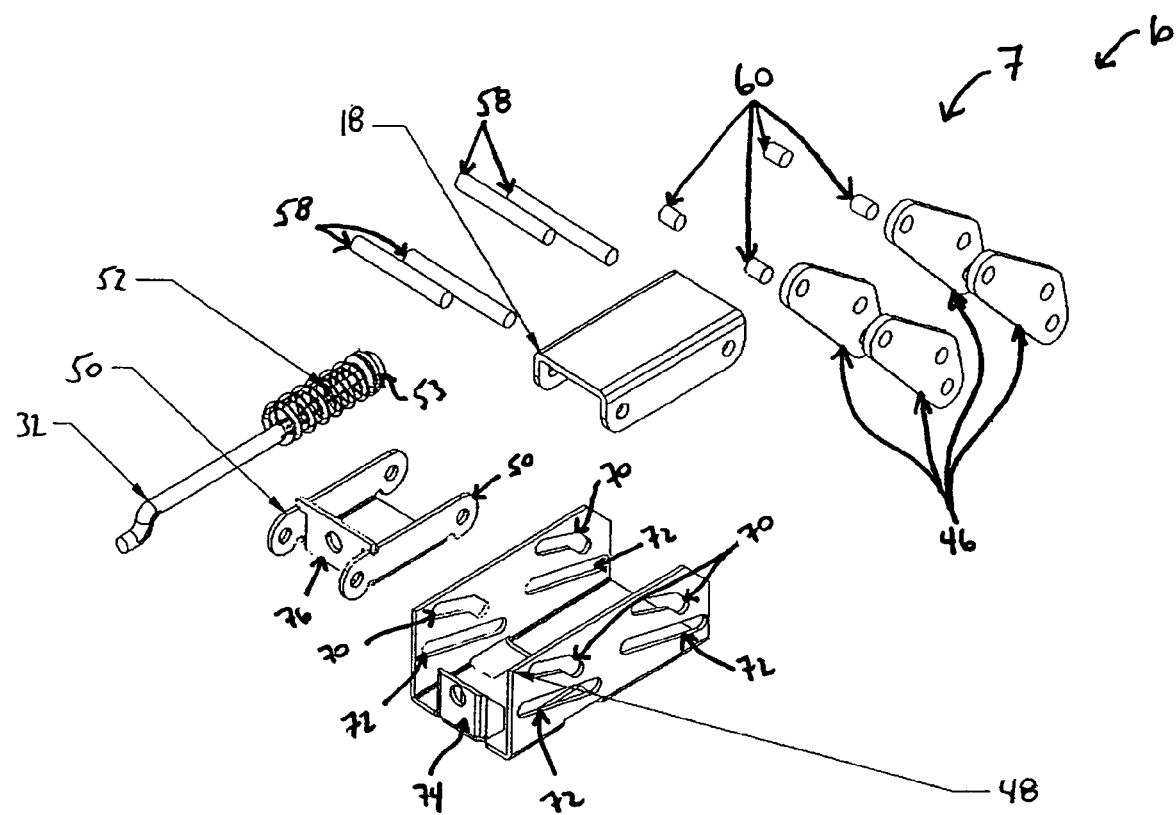
FIG. 8 is an exploded view of a complementary support.
Figure 13:
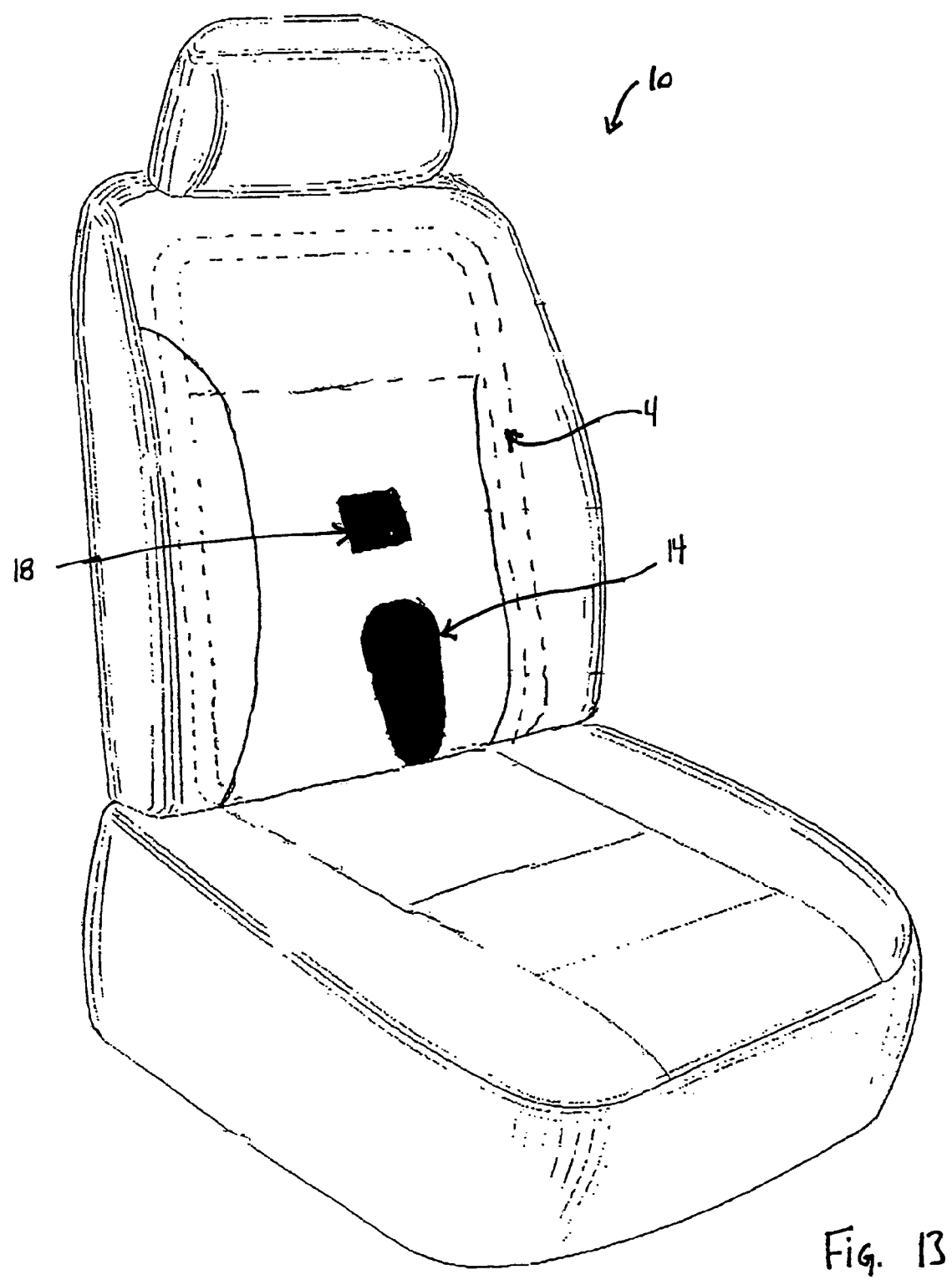
FIG. 13 is a front perspective view of a seat having a sacral support and a thoracic-lumbar support.
Figure 14:
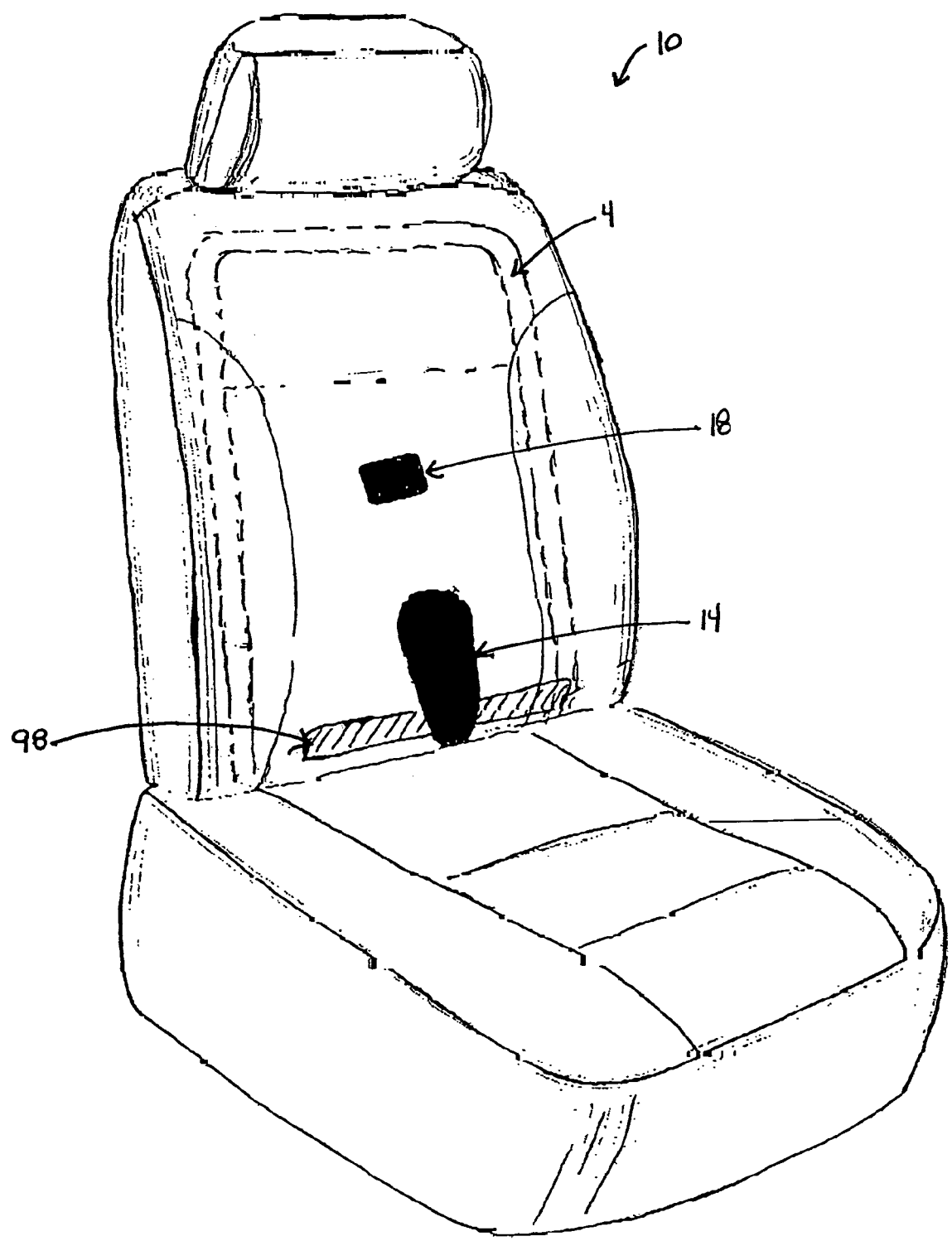
FIG. 14 is a front perspective view of a seat having a sacral support, a thoracic-lumbar support, and a load distribution material.

As illustrated in FIG. 8, complementary support 7 includes a support member 18, pitch poles 46, parallel bars 50, and a pull cable assembly 32. Support member 18 can be formed of a rigid material, as described above relative to the sacral support member. Support member 18 is shaped to correspond with a targeted region of the back. For example, as shown in FIGS. 1-6 and 8, support member 18 is rectangular, so as to provide support to the thoracic-lumbar transition of a user's spine. FIGS. 13-17 illustrate the location of support member 18 relative to the seatback and seat frame 4. In particular, FIGS. 13-17 illustrate support member 18 positioned within the seatback at a location that corresponds with the thoracic-lumbar transition of a user's spine.

The support member of the complementary support system can also be provided with a load distribution material as described above relative to sacral support member 14. FIGS. 15-17 provide various shapes in which a load distribution material 98 can be provided within a seatback. Additionally, a cushioning material as described above is also provided between the user and the support member 18.

Referring to FIG. 6, support member 18 is pivotally connected by pegs 60 to pitch poles 46. Pitch poles 46, are slidably positioned within the walls of cam profile channel 48, which is secured to base plate 16. In general, the pitch poles are configured so that an end of the pitch poles travels away from the cam profile channel and toward a user's back. To achieve this, pins 58 are inserted into holes in pitch poles 46 and positioned within cam profiles 70 and 72. In addition, parallel bars 50 connect pitch poles 46. Parallel bars 50 are rotatably secured to pitch poles 46 by pins 60. Parallel bars 50 force the pitch poles to move simultaneously relative to cam profile channel 48. Because pins 58 track cam profiles 70 and 72, the free ends of the pitch poles travel in a relatively linear path away from the cam profile channel. As a result, support member 18 is urged towards the targeted portion of the user's back.

Referring to FIG. 8, a drive system is used to deliver the complementary support member. The illustrative drive system includes a complementary support actuator 32, a cable guide 74, a cross-bar 76 connected to parallel bars 50, a compression spring 52, and a spring cap 53. Complementary support actuator 32 is disposed axially through spring 52 and the center hole provided in cross-bar 76. Spring cap 53 secures complementary support actuator to spring 52. As such, when complementary support actuator 32 is pulled through cable guide 74, pressure builds between spring 52 and cross-bar 76. When the force stored in spring 52 exceeds the outside pressure applied by the seatback, parallel bars 50 begin to move toward cable guide 74. As a result, support member 18 moves toward the user's back.

Referring to FIGS. 1-6, sacral support system 5 and complementary support system 7 are used in combination to provide both sacral support and thoracic-lumbar support. The adjustable support system can deliver support in a variety of configurations, which can be controlled by the user. For example, FIGS. 1 and 2 illustrate a first embodiment of the present invention in which the sacral support member 14 and the complementary support member 18 are both retracted. FIGS. 3 and 4 illustrate sacral support member 14 and complementary support member 18 fully extended. FIGS. 5 and 6 illustrate sacral support member 14 fully extended and complementary support member 18 partly extended.

As illustrated in FIGS. 1-6, the adjustable support system can be configured so that a single control unit synchronously controls the position of both the sacral support system and the complementary support system. As shown in FIG. 3, actuator cables 24, 28, and 32 are connected to lever 26. When the main actuator cable 24 is retracted, lever 26 travels downward relative to the seatback. As a result, actuators 28 and 32 are retracted, thus effecting delivery of sacral support member 14 and support member 18. The ratio of sacral support to complementary support is adjustable. This ratio can be adjusted by changing the position where the actuator cables are attached to lever 26. As such, the adjustable support system can be configured so that the sacral support travels farther toward a user than the complementary support, thereby providing a greater level of specific support and comfort.

In addition, the adjustable support system of FIGS. 1-6 includes a suspension. In use, pressure applied to the sacral support by a user's sacrum is counterbalanced by pressure applied to the complementary support by a user's thoracic-lumbar area. Moreover, springs 44 and 52 provide additional comfort by at least partly absorbing rearward forces created, for example, when a user changes positions in the seat, drives over uneven terrain, or encounters turbulence, depending on the application in which the adjustable support system is used. The stiffness of the spring suspension can be changed by using either stiffer or less stiff springs 44 and 52, or by eliminating springs 44 and 52 altogether.

Adjustable support system 10 can be controlled by a conventional electric take-up motor or manually. A conventional rotary cam drive can facilitate manual operation. Other suitable drive systems include worm drives, and chain drives. Indeed, many alternate drive systems that can effect movement of an actuator cable or lever can be used to control the adjustable support system 10. Moreover, it should be noted that the sacral support system can be configured to function synchronously or independently of complementary support system.

Figure 22:
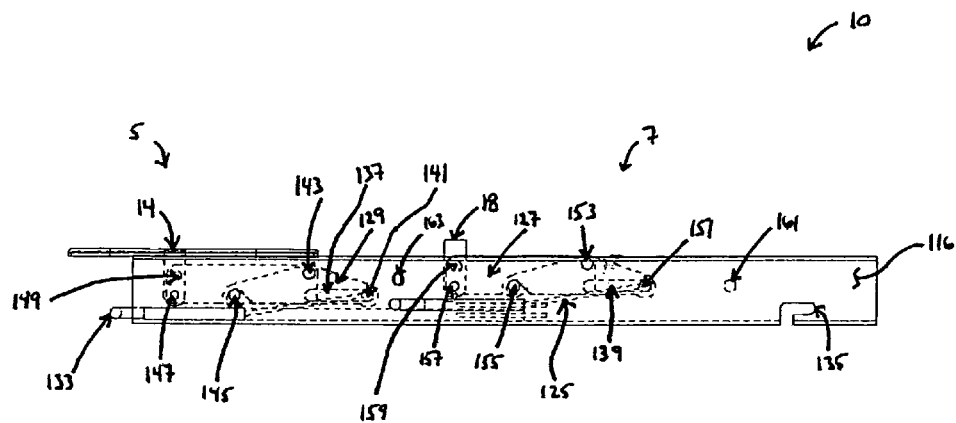
FIG. 22 is a side sectional view of an adjustable support system including a sacral support in a retracted position and a complementary support in a retracted position.

Referring to FIGS. 22-26, a second embodiment of an adjustable support system 10 is shown, including sacral support system 5 and complementary support system 7. Adjustable support system 10 is configured to deliver sacral support member 14 and complementary support 18 a distance of 3 inches or more toward a user. Sacral support member 14 is configured as described above with respect to the previous embodiment. Complementary support member 18 is formed from a rigid, rectangular block, as illustrated in FIG. 22.

Figure 24:
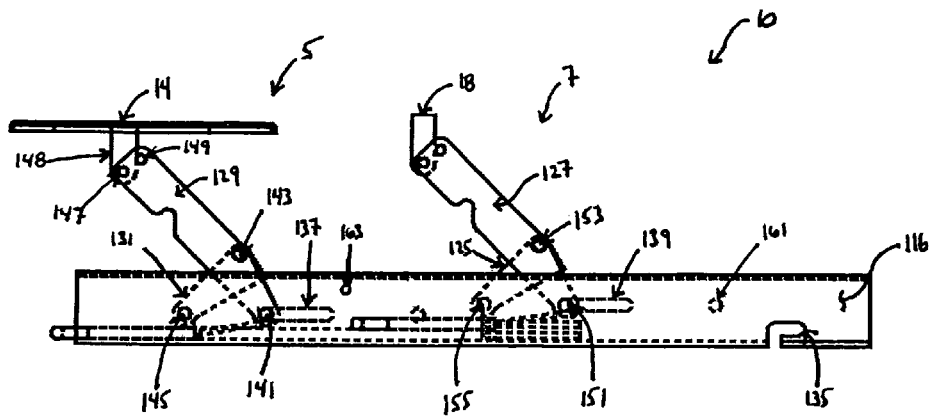
FIG. 24 is a side sectional view of an adjustable support system including a sacral support in an extended position and a complementary support in an extended position.
Figure 26:
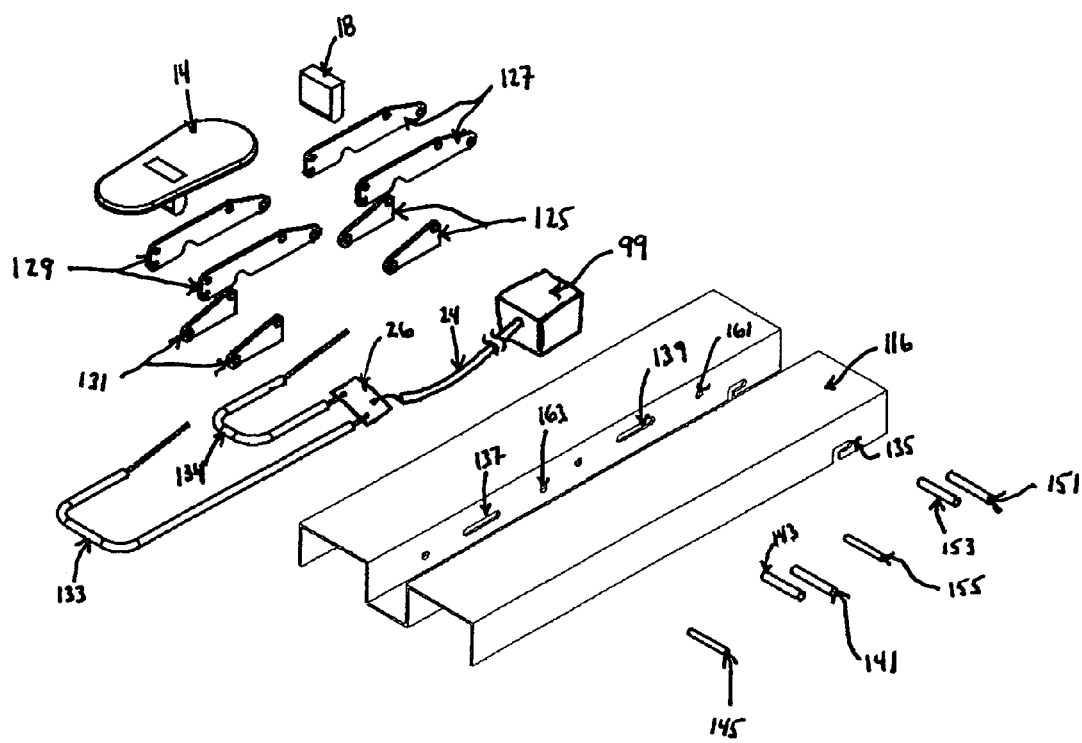
FIG. 26 is an exploded view of an adjustable support system including a sacral support and a complementary support.

As illustrated in FIG. 26, similar delivery mechanisms are used to deliver the sacral support member and the complementary member. Sacral support system 5 includes lift arms 129, cantilever arms 131, and sacral support actuator cable 133. As illustrated in FIG. 24, lift pin 141 is disposed through cam profiles 137 and lift arms 129. Cantilever pin 143 is disposed through cantilever arms 131 and lift arms 129 so as to pivotally connect cantilever arms 131 to lift arms 129. Support pin 145 secures an end of cantilever arms 131 to base plate 116. Actuator cable 134 is secured to lift pin 141.

Figure 23:
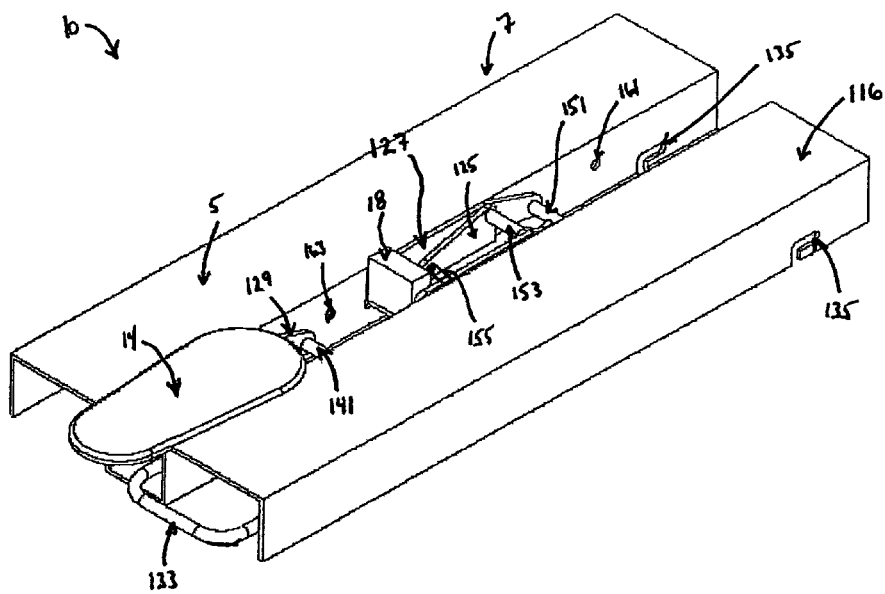
FIG. 23 is a front perspective view of an adjustable support system including a sacral support in a retracted position and a complementary support in a retracted position.
Figure 25:
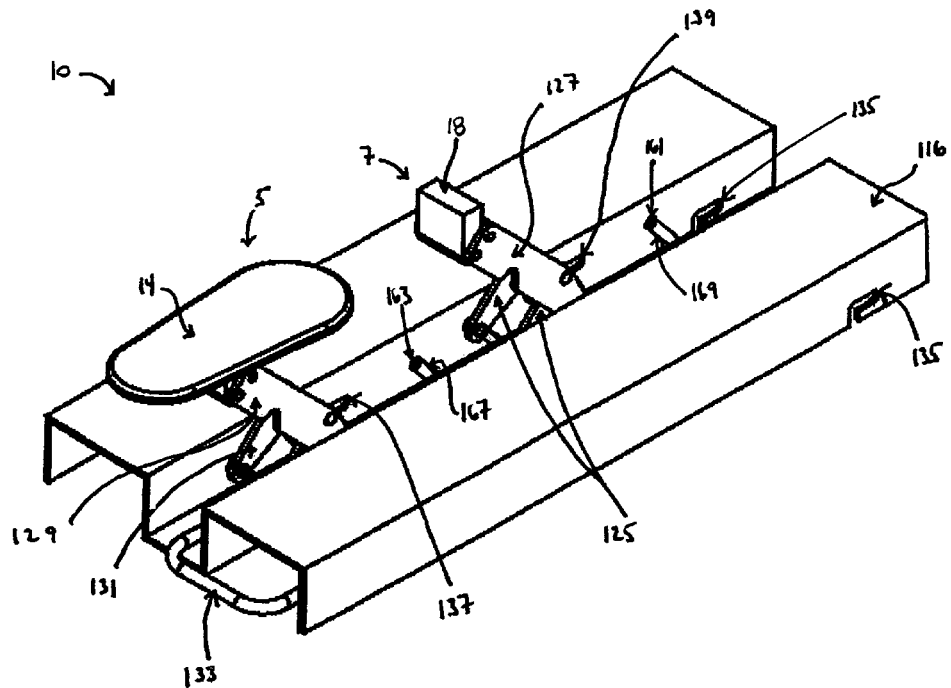
FIG. 25 is a front perspective view of an adjustable support system including a sacral support in an extended position and a complementary support in an extended position.

Actuator cable 133 can be operated by a take-up motor or manually, as described above with respect to the previous embodiments. In particular, retraction of actuator cable 133 causes lift pin 141 to slide along cam profiles 137. As lift pin 141 slides along cam profiles 137, lift arms 129 pivot about cantilever arms 131 and cantilever pin 143. Sacral support member 14, which is pivotally attached to lift arm 129 (to provide a tilt as described above), travels towards a user's sacral area, thereby providing increased sacral support as shown in FIGS. 24-25. To decrease the amount of sacral support, a user operates the take-up motor (or manual drive) let out actuator cable 133. As actuator cable 133 is returned to a disengaged position, the rearward force provided by the seatback and the user's sacrum moves sacral support member 14, lift arms 129, and cantilever arms 131 into a disengaged position, as shown in FIGS. 22-23. Optionally, a spring return system can be included to assist in returning the sacral support member to a disengaged position. To add a spring return system, a pin 167 is inserted into holes 163, and a spring is used to connected pin 167 and lift pin 141, as shown in FIG. 25.

Similarly, complementary support system 7 includes lift arms 127, cantilever arms 125, and complementary support actuator cable 134. As illustrated in FIG. 24, lift pin 151 is disposed through cam profiles 139 and lift arms 127. Cantilever pin 153 is disposed through cantilever arms 125 and lift arms 127 so as to pivotally connect cantilever arms 125 to lift arms 127. Support pin 155 secures an end of cantilever arms 125 to base plate 116. Actuator cable 134 is secured to lift pin 141.

Actuator cable 134 can be operated by a take-up motor or manually, as described above with respect to the previous embodiments. In particular, retraction of actuator cable 134 causes lift pin 151 to slide along cam profiles 139. As lift pin 151 slides along cam profiles 139, lift arms 127 pivot about cantilever arms 125 and cantilever pin 153. Complementary support member 18, which is pivotally attached to lift arm 127, travels towards a user's thoracic-lumbar area, thereby providing increased support as shown in FIGS. 24-25. To decrease the amount of complementary support, a user operates a take-up motor (or manual drive) let out actuator cable 134. As actuator cable 134 is returned to a disengaged position, the rearward force provided by the seatback and the user's thoracic-lumbar area moves complementary support 18, lift arms 127, and cantilever arms 125 into a disengaged position, as shown in FIGS. 22-23. Optionally, a spring return system can be included to assist in returning the complementary support member to a disengaged position. To add a spring return system, a pin 169 is inserted into holes 161, and a spring is used to connected pin 169 and lift pin 151, as shown in FIG. 25.

Referring to FIG. 22, when sacral support system 5 and complementary support system 7 are in a fully retracted position, sacral support member 14 and complementary support 18 are generally flush with support base 116. As a result, the user experiences little or no sacral or complementary support from the sacral support member and the complementary support member. As in the previous embodiments, the sacral support system can be provided as a stand-alone support system or in combination with the complementary support system. When the adjustable support system is provided with a sacral support system and a complementary system, the adjustable support system can be operated by a single motor 99. For example, referring to FIG. 26, actuator cable 24 controls actuator cables 133 and 134, and in turn, sacral support system 5 and complementary support system 7. Additionally, since actuator cables 133 and 134 are interconnected by lever 26, the adjustable support system 10 of FIGS. 22-26 is controlled as described above with respect to FIGS. 1-6. That is, the ratio of sacral support to complementary support is adjustable by changing the position where the actuator cables are attached to lever 26. Thus, the adjustable support system illustrated in FIGS. 22-26 can be configured so that the sacral support travels farther toward a user than the complementary support, thereby providing a greater level of specific support to a user's sacral-pelvic area. In addition, since the adjustable support system and the sacral support system are both secured to lever 26, rearward pressure applied to the sacral support by a user's sacrum or an obstructive element is counterbalanced by rearward pressure applied to the complementary support by a user's thoracic-lumbar area.

The embodiments described above and shown herein are illustrative and not restrictive. The scope of the invention is indicated by the claims rather than by the foregoing description and attached drawings of individual embodiments. The invention may be embodied in other specific forms without departing from the spirit of the invention. For example, other support systems may be used with the present invention. In addition, the shape and construction of the load distribution material and associated structures could be varied while still achieving the preferred functionality. For example, a unitary structure may be used instead of a separate cushion, load distribution material, and sacral support member. Additional cushions and load distribution materials may be included between the sacral support member and the user in accordance with the principles discussed above. In another alternative, the cushioning and/or load distribution materials may have cut-out portions adapted to, for example, receive the sacral support member or the PSIS's of the ilias. In yet another alternative, the load distribution material may partially support or cover the PSIS's of the ilias. In still another embodiment, a load distribution material and/or cushioning could be omitted entirely. In another embodiment, a pair of supports corresponding to the PSIS's of the ilias can be selectively adjusted in a rearward direction, thereby creating a central sacral support area. Accordingly, these and other changes that come within the scope of the claims are intended to be embraced herein.

We claim:

1. A device for supporting a user's sacral anatomy in a seated position, the device comprising:
    a seat having a seat back with a front portion, a rear portion and a frame, the front portion including a support cushion therebehind;
    a support member operably connected to the frame;
    an adjustable sacral support member pivotally connected to the support member,
    an adjusting assembly, actuatable by a seated user, and connected to the sacral support member to move the sacral support member relative to the support member and thereby toward and away from a rear surface of the front portion of the seat back;
    a second support member operably connected to the frame and spaced from the sacral support member;
    a complementary support member operably connected to the second support member to permit the seated user to control the fit and comfort of the seat back to the spine and adjacent anatomical structures;
    wherein the sacral support member is operably connected to the complementary support member to provide a proportional support there between as the sacral support member and the complementary support member are actuated;
    an actuator operably connected to the adjusting assembly and sacral support member and the complementary support member, wherein the actuator is configured to control the position of the sacral support member and the complementary support member relative to the frame; and
    wherein the sacral support member is configured to extend a first maximum distance relative to the frame, and the complementary support member is configured to extend a second maximum distance relative to the frame, wherein the first maximum distance is greater than the second maximum distance.

2. The device of claim 1 wherein the sacral support member is configured to tilt between 40 and 85 degrees relative to the frame.

3. The device of claim 2 wherein the sacral support member travels a distance of about 3 inches relative to the frame.

4. The device of claim 1 further comprising a cable suspension interconnecting the sacral support member with the complementary support member so that each is actuated in tandem by the cable suspension.

5. The device of claim 1 further comprising a load distribution material disposed between the cushion and the front portion.

6. The device of claim 1 further comprising a load distribution material disposed between the cushion and the sacral support member.

7. A device for supporting a user's sacral anatomy in a seated position, the device comprising:
    a seat having a seat back with a front portion, a rear portion and a frame, the front portion including a support cushion there behind;
    a support member operably connected to the frame; and
    an adjustable sacral support member pivotally connected to the support member, the sacral support member being operable to move toward and away from a rear surface of the front portion of the seat back,
    a second support member operably connected to the frame and a complementary support member operably connected to the second support member with the sacral support member being operably connected to the complementary support member,
    an actuator operably connected to the sacral support member and the complementary support member, wherein the actuator is configured to control the position of the sacral support member and the complementary support member relative to the frame, and
    wherein the sacral support member is configured to extend a first maximum distance relative to the frame, and the complementary support member is configured to extend a second maximum distance relative to the frame with the first maximum distance being greater than the second maximum distance.

* * * * *